US012715406B2

(12) United States Patent
Schneider et al.

(10) Patent No.: US 12,715,406 B2
(45) Date of Patent: Aug. 25, 2026

(54) ADVANCED BRAKING SYSTEM FOR WORK MACHINES

(71) Applicant: Caterpillar Global Mining Equipment LLC, Denison, TX (US)

(72) Inventors: Karl Paul Schneider, Decatur, IL (US); Cameron Thomas Lane, Oro Valley, AZ (US); Andrew John Olson, Vail, AZ (US)

(73) Assignee: Caterpillar Global Mining Equipment LLC, Denison, TX (US)

( * ) Notice: Subject to any disclaimer, the term of this patent is extended or adjusted under 35 U.S.C. 154(b) by 408 days.

(21) Appl. No.: 18/209,860

(22) Filed: Jun. 14, 2023

(65) Prior Publication Data

US 2024/0416880 A1 Dec. 19, 2024

(51) Int. Cl.

| | |
|---|---|
| ***B60T 8/32*** | (2006.01) |
| ***B60T 7/06*** | (2006.01) |
| ***B60T 7/12*** | (2006.01) |
| ***B60T 8/17*** | (2006.01) |
| ***B60T 8/1755*** | (2006.01) |

(52) U.S. Cl.

CPC .............. *B60T 8/3255* (2013.01); *B60T 7/06* (2013.01); *B60T 7/12* (2013.01); *B60T 8/1701* (2013.01); *B60T 8/17551* (2013.01); *B60T 8/17555* (2013.01); *B60T 2220/04* (2013.01)

(58) Field of Classification Search

CPC . B60T 7/06; B60T 7/12; B60T 8/3255; B60T 8/1701; B60T 8/17551; B60T 8/17555; B60T 8/1708; B60T 2220/04; B60T 8/3275; B60T 8/326; B60T 8/245; B60T 8/86; B60T 8/3215; B60T 13/585; B60T 13/586; B60T 2270/60; B60T 2270/604; B60T 2270/611

See application file for complete search history.

(56) References Cited

U.S. PATENT DOCUMENTS

| | | | |
|---|---|---|---|
| 8,521,391 B2 | 8/2013 | Krueger et al. | |
| 9,266,511 B2 | 2/2016 | Pihl et al. | |
| 10,259,438 B2 * | 4/2019 | Goto ..................... | B60T 13/662 |

(Continued)

FOREIGN PATENT DOCUMENTS

| | | |
|---|---|---|
| DE | 19642503 A1 | 5/1997 |
| WO | 2022123503 A1 | 6/2022 |

OTHER PUBLICATIONS

Written Opinion and International Search Report for Int'l. Patent Appln. No. PCT/US2024/029038, mailed Aug. 22, 2024 (9 pgs).

*Primary Examiner* — Thomas J Williams

(57) ABSTRACT

A work machine with a frame, an engine, a drivetrain powered by the engine, a ground-engaging member connected to the drivetrain, an operator cabin supported by the frame, a work implement, and a braking system connected to the ground-engaging member. The braking system including a brake input device located in the operator cabin for providing an input from an operator, at least one braking sub-system associated with the drivetrain, and a controller having at least one advanced braking feature, the braking system applying an automatic braking force in response to the at least one advance braking feature, and applying an additional progressive braking force in response to the input from the operator.

20 Claims, 5 Drawing Sheets

(56) References Cited

U.S. PATENT DOCUMENTS

| | | | | |
|---|---|---|---|---|
| 2004/0155523 | A1 | 8/2004 | Frentz et al. | |
| 2007/0096556 | A1 | 5/2007 | Kokubo et al. | |
| 2012/0205178 | A1* | 8/2012 | Heine | B60W 10/06 180/282 |
| 2015/0360655 | A1 | 12/2015 | Odate et al. | |
| 2016/0375880 | A1* | 12/2016 | Farmer | B60T 8/1701 701/50 |
| 2017/0174189 | A1* | 6/2017 | Richards | B60T 7/042 |
| 2018/0244247 | A1* | 8/2018 | Carlsson | B60T 8/1708 |
| 2018/0244269 | A1 | 8/2018 | Carlsson et al. | |
| 2019/0351904 | A1* | 11/2019 | Anderson | B60T 7/12 |
| 2020/0017078 | A1* | 1/2020 | Perlick | B60W 10/06 |
| 2020/0384961 | A1* | 12/2020 | McKnight | B60T 13/585 |
| 2022/0118959 | A1 | 4/2022 | Johnson et al. | |
| 2023/0104377 | A1 | 4/2023 | Singh et al. | |
| 2024/0416880 | A1* | 12/2024 | Schneider | B60T 8/1701 |

* cited by examiner

ADVANCED BRAKING SYSTEM FOR WORK MACHINES

TECHNICAL FIELD

The present disclosure generally relates to work machines, and more specifically relates to braking systems for work machines.

BACKGROUND

Mobile work machines may be used in the heavy industries such as mining, construction, and the like to transport materials and personnel. These work machines are often large in size, and require an operator, e.g., a driver, to manually operate the machine in order for the machine to perform its designated/intended operations. For example, such haul and dump trucks often weigh in excess of a million pounds, stand over two stories tall, and can carry over 300 tons of payload. Such work machines may be powered by various sources including traditional fuel-injected powerplants, hybrid powerplants having fuel-injected components coupled with electric power components, fully electric powerplants, fuel cells, or any combination of the same.

In order to properly generate a braking force appropriate for a vehicle of its size, and to conserve energy, work machines may include multiple braking and energy absorption systems. Typical machines may include systems such as mechanical friction brakes, electric resistive grids, battery regeneration, hydraulic retarders, and engine compression brakes. It is desirable to control the multiple braking and energy absorption systems simultaneously such that certain systems may be put in to use or not used. For example, it may be desirable to prioritize battery regeneration up to the system limit, or avoid use of mechanical friction brakes due to wear or overheating concerns. Having an operator interface for each system would not be practical, and a combined interface with intelligent feedback is desirable. This may be complicated by the capacities of each of the braking energy absorption systems changing dynamically, and may not be constant with ground speed. These systems may also be influenced by ambient operating conditions such as temperature and altitude, or by electrical component states such as full charges, component temperatures, system states, and the like.

The machine may also include advanced braking controls such as automatic grade brake speed control, anti-lock brake control, traction control, stability control, or any automatic application of braking without operator input. In a typical operation of multiple braking energy absorption systems, these functions apply braking beyond the neutral operator interface starting point. Thus, when the operator applies additional braking input, no additional braking force is applied until a pedal position exceeds that of a position required for an equivalent non-automatic braking force. While depicted and described as an operator foot actuated pedal, the braking input may be provided by a pedal, a lever, or any other brake demand input device.

While additional braking force may not necessarily be required, this range of operation experienced by the operator is known as "deadband" and provides the operator with an uneasy sensation due to inconsistent response of the system for the same input. In the case of downhill applications where braking demands are high, the deadband may be large.

Moreover, work machines may include operator interface mapping for multiple braking systems. In typical mechanical systems, the operator interface mapping may be linear, and calculated on brake force or torque consistent with displacement based on the physical hydraulic actuation system, as the torque or force capability is available throughout the speed range. In typical electrical or hybrid braking systems, operator interface mapping may be based on ground speed and the constant power required for the ground speed and thus calculated based on changing torque or force capability, as the torque or force capability is based on power, and will decrease through the speed range.

In light of the aforementioned shortcomings, there is a need for a work machine with a braking system having several braking sub-systems that may be simultaneously controlled. There is also a need for a work machine with an advanced brake pedal in conjunction with the braking system that provides variable feedback and response such that no deadband between sub-system activation occurs, and that consistent and reliable machine response is achieved for the same operator input.

SUMMARY OF THE DISCLOSURE

In accordance with one aspect of the disclosure, a work machine may be provided. The work machine may have a frame, an engine supported by the frame, a drivetrain connected to the engine, a ground-engaging member connected to the drivetrain, an operator cabin supported by the frame, a work implement supported by the frame, and a braking system. The braking system may have a pedal located in the cabin for providing an input from an operator, may have at least one braking sub-system associated with the drivetrain, and may have a controller having at least one advanced braking feature. In operator the at least one advanced braking feature may prompt the controller of the braking system to apply an automatic braking force without the input from the operator, and the braking system may provide a force feedback to the pedal.

In accordance with another aspect of the disclosure, a braking system for a work machine may be provided. The braking system may include a pedal located in a cabin for providing an input from an operator, at least one braking sub-system, and a controller. The controller may have at least one advanced braking feature, the at least one advanced braking feature prompting the controller of the braking system to apply an automatic braking force without the input from the operator, and the braking system providing a force feedback to the pedal.

In accordance with yet another aspect of the disclose, a method of operating a work machine may be provided. The method may include providing the work machine having a braking system with a brake pedal, at least one braking sub-system connected to the brake pedal, and a controller. The method may include detecting an adverse operating condition through at least one advanced braking feature. The method may further include alerting the controller of the adverse operating condition and sending a brake command from the controller to the at least one braking sub-system and automatically applying a braking force. The method may further include transmitting a pedal feedback signal from the controller to the brake pedal, and may include generating a pedal force feedback. As such, an operator experiences no deadband of braking when applying the input to the brake pedal, and experiences distinct pedal force feedback when transitioning between different ones of the at least one braking sub-system as a means to operate within the limits of active sub-systems.

These and other aspects and features of the present disclosure will be more readily understood when read in conjunction with the accompanying drawings.

DETAILED DESCRIPTION

Figure 1:
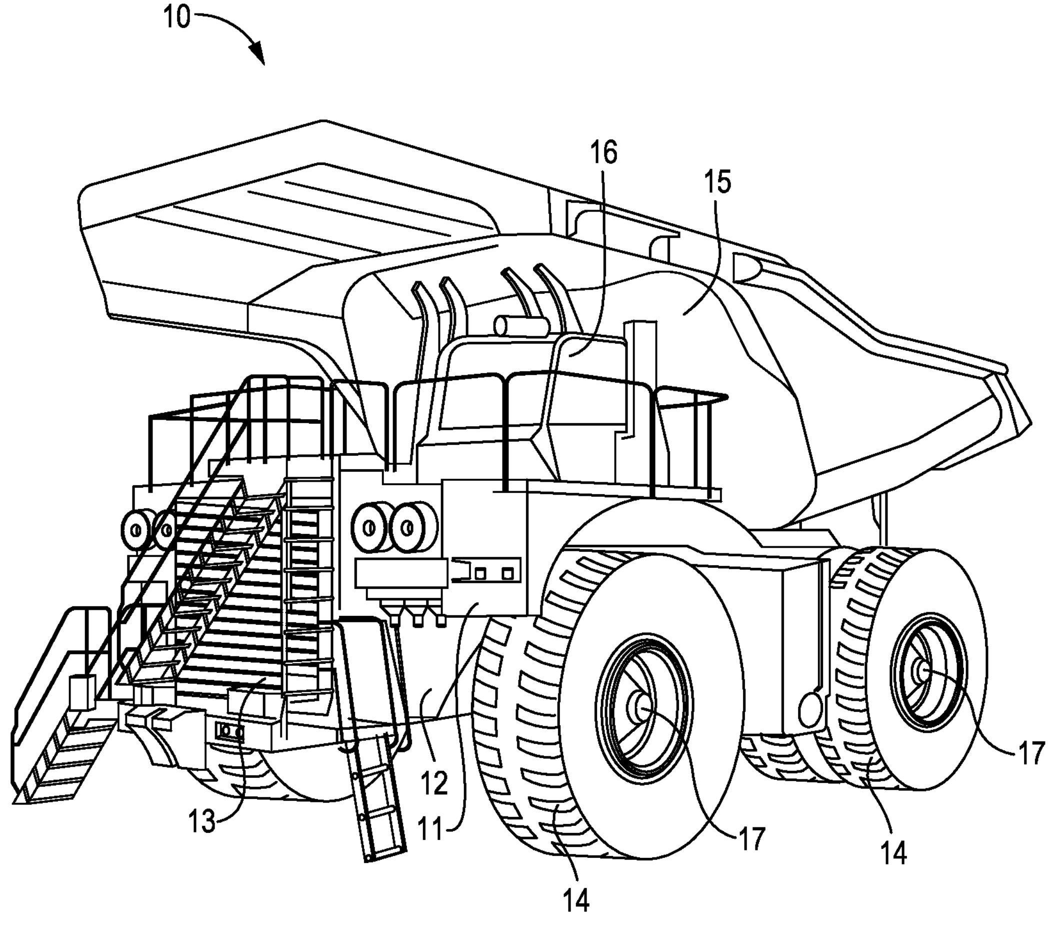
FIG. 1 is a perspective view of a work machine constructed in accordance with an embodiment of the present disclosure.

Referring now to the drawings, and with specific reference to FIG. 1, a work machine is depicted and generally referred to using reference numeral '10'. The work machine 10 is exemplarily embodied in the form of a mining truck. While the work machine 10 is depicted as a mining truck, it should be noted that a type of machine used is merely exemplary and illustrative in nature. It will be acknowledged that the teachings of the present disclosure can be similarly applied to other types of machines including but not limited to, excavators, loaders, track-type tractors, motor graders, off highway trucks and other types of machines known to persons skilled in the art. Such haul and dump trucks often weigh in excess of a million pounds, stand over two stories tall, and can carry over 300 tons of payload. Slowing machines of this size is not easy and braking systems of these machines are required to be robust.

Mining machines are used to transport materials within mining sites. The exemplary work machine 10 is supported by a frame 11. The work machine 10 may include a drivetrain 12 powered by an engine 13 and driving ground-engaging members 14 contacting the ground and supporting the frame 11 in order to operate the work machine 10. The work machine 10 may also include an implement 15 to perform a work job. In the view of FIG. 1, since the work machine 10 is a mining truck, the implement 15 is exemplarily depicted as a dump body, but with other machines the implement may be other types of work implements known to persons skilled in the art. The work machine 10 may also include an operator cabin 16 for an operator to control the operation of the work machine 10. The operator cabin 16 may include controls (not shown) for the operator to use including a braking pedal for controlling brakes 17 as part of a braking system 20 of the work machine 10.

Figure 2:
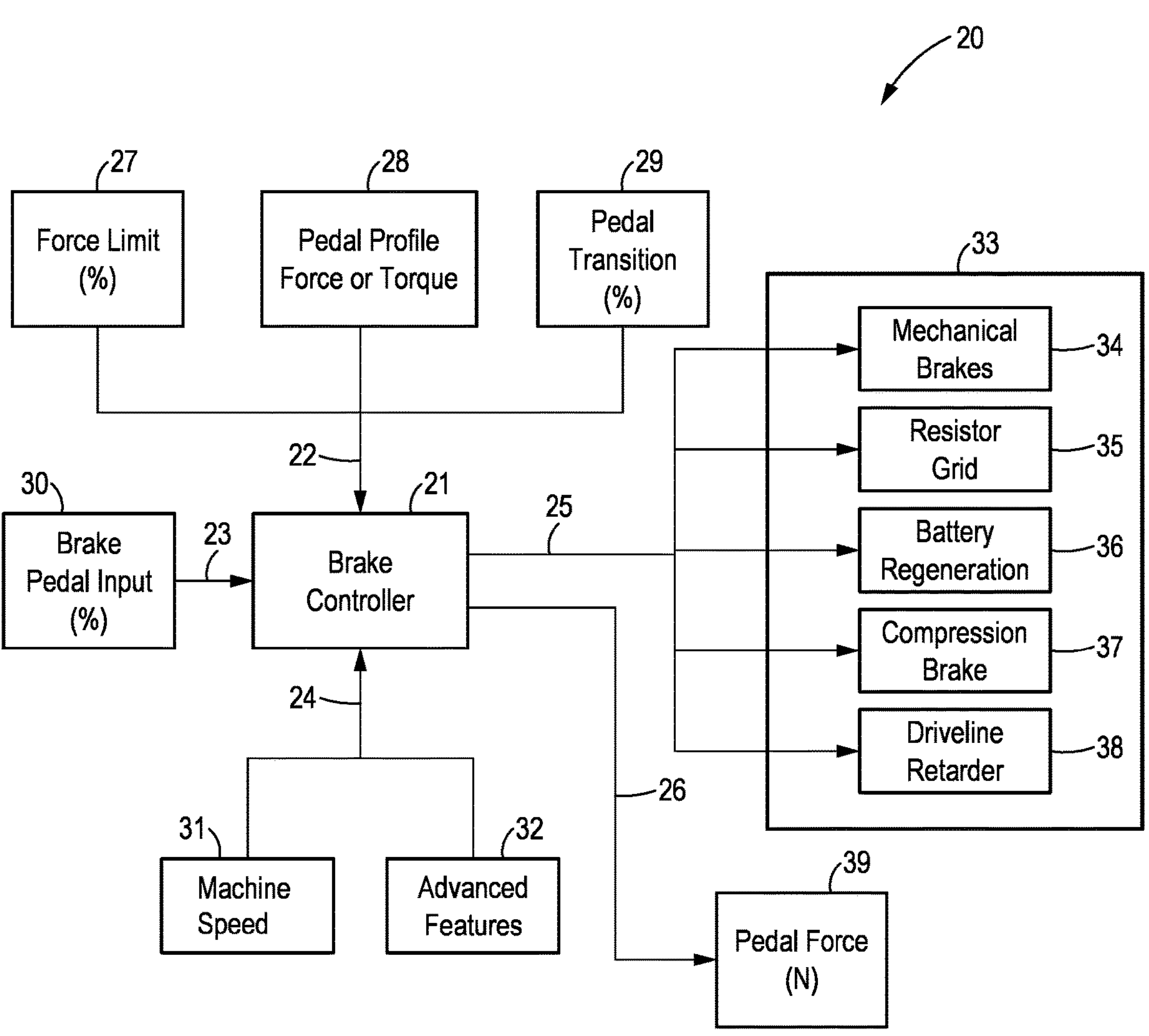
FIG. 2 is a block diagram schematically illustrating a braking system of the machine in accordance with an embodiment of the present disclosure.

One of those controls may be a braking system 20. A representation of the braking system 20 is shown schematically in FIG. 2. The braking system 20 may include a brake controller 21 for controlling the operation of the braking system 20 and to receive input from the operator via a brake input device. The brake input device is depicted and described as a brake pedal 40, however, other brake input devices such as levers and dials, among other controls to modulate braking of the work machine 10, may be implemented. The brake controller 21 may be configured to receive configuration settings 22 of the brake pedal 40 of the work machine 10, receive an operator input signal 23, receive a machine status signal 24, send a brake command signal 25 to one of at least one braking sub-system 33, and optionally send a pedal feedback signal 26 to the operator.

Some characteristics of the braking of the work machine 10 may be set as a default though the configuration settings 22. These configuration settings 22 may be configurable based on the brake system type of the work machine 10, the job required by the work machine 10 to perform, or based on driving styles of individual operators. The configuration settings 22 may include parameters such as a force limit 27 that the operator may place on the brake pedal 40, a pedal profile 28 as a representation of how the brake controller 21 interprets the position of the brake pedal 40 as a torque or power request percent of 100%, and a pedal transition 29, defined herein as the point of the travel of the brake pedal 40 wherein the braking system 20 provides additional braking power using braking energy derived from additional ones of the at least one braking sub-system 33.

The operator input signal 23 of the braking system 20 may be determined based on a brake pedal input 30. For example, as the operator steps on the brake pedal 40, the brake controller 21 may determine the brake pedal input 30 based on the position of the brake pedal 40 as a percentage of a predetermined range of travel of the brake pedal.

The work machine 10 may report its status while in operation to the brake controller 21 through the machine status signal 24. The machine status signal 24 may be based on parameters such as a machine speed 31, as well as if any of the at least one advanced braking feature 32 of the braking system 20 of the work machine 10 are active. The at least one advanced braking feature 32 of the braking system 20 may be configured to provide a braking force on the work machine 10 during operation in conditions such as downhill and slippery terrain where an automatic braking force is required without input from the operator. Such examples of the at least one advanced braking feature 32 may include: automatic grade brake speed control, for providing additional braking force to counter the weight of the machine during operating on a downhill grade: anti-lock brake control, for preventing brakes of the work machine from locking and causing the machine to skid; traction control, for monitoring the work machine as it travels on unstable surfaces such as gravel; and stability control, for monitoring the work machine as it travels on uneven or non-level surfaces: although others are certainly possible.

The brake controller 21 may issue a brake command signal 25 to any of the at least one braking sub-system 33 present on the work machine 10. These sub-systems may include traditional mechanical brakes 34, a resistor grid system 35, a battery regeneration system 36, a compression brake 37, and a driveline retarder 38. The brake command signal 25 may be issued to any of the at least one braking sub-system 33 individually or simultaneously.

The braking system 20 may be configured such that braking force of the work machine 10 is the same. The brake pedal 40 of the work machine 10 may be a passive pedal having a mechanical spring providing feedback to the operator, or optionally, may be a dynamic pedal providing customized force feedback to the operator. Where the brake pedal 40 is a dynamic pedal, the brake controller 21 sends the pedal feedback signal 26 to the brake pedal 40, which may provide a pedal force 39. The pedal force 39 may increase with displacement, but may also be configured to change when additional ones of the at least one braking sub-system 33 are commanded to be active by the brake controller 21.

Figure 3:
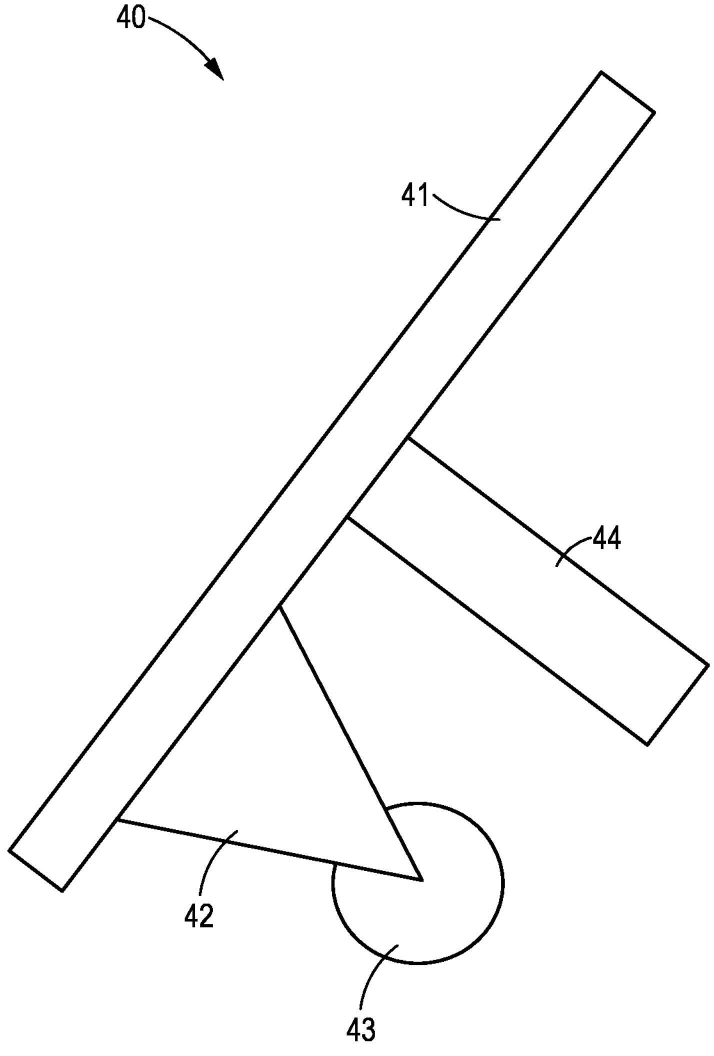
FIG. 3 is a schematic side view of a brake pedal assembly in accordance with an embodiment of the present disclosure.

One embodiment of a brake pedal 40 of the work machine 10 is shown in FIG. 3. The brake pedal 40 may include a footbed 41 that the operator may press with a foot in order to actuate. A pedal mechanism mount 42 connects the footbed 41 of the brake pedal 40 with the operator cabin 16 either from a floor, a firewall, or suspended from the underside of a dash. The brake pedal 40 may include a position sensor 43 in order to sense the actuation position of the brake pedal 40. The position sensor 43 is depicted as a rotary position sensor, but may be a linear sensor, or any position sensor of the like. The brake pedal 40 of FIG. 3 is depicted as a dynamic pedal and accordingly, a force reaction actuator 44 is attached to the footbed 41 to provide the pedal force 39 to the operator to receive feedback of the operation of the braking system 20.

Figure 4:
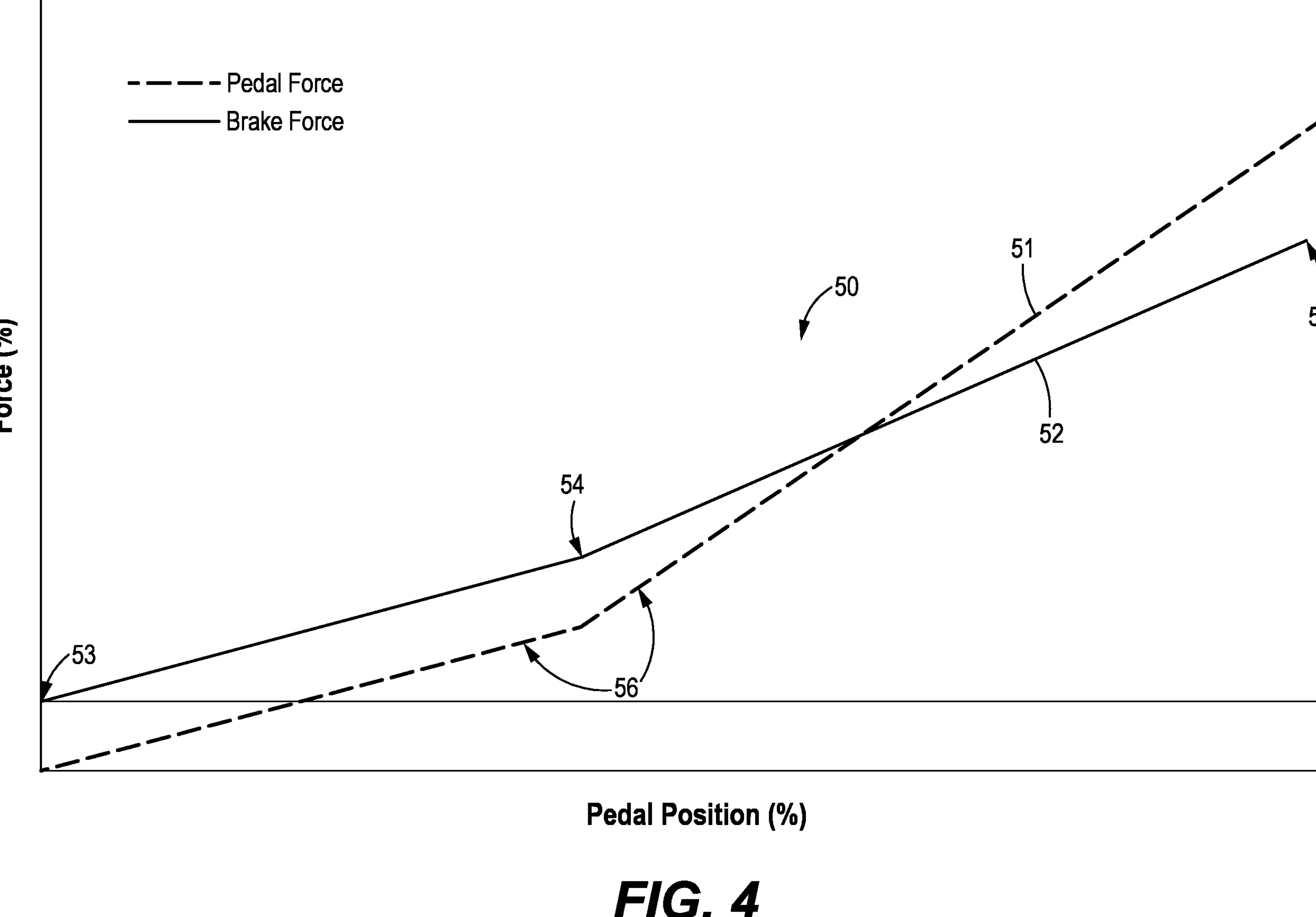
FIG. 4 is a chart schematically illustrating the operation of the braking system of the machine as a function of the pedal travel input from the operator in accordance with an embodiment of the present disclosure.

A graphical representation of a performance 50 of the braking of the work machine 10 with the brake pedal 40 is shown schematically in FIG. 4 as braking force (as a percentage) as a function of pedal position (as a percentage). A pedal force curve 51 is represented in FIG. 4 as a dotted line, and a brake force curve 52 is represented as a solid line. When pedal position is at zero percent of its range, a brake force adjustment 53 may be made by the braking system 20 if the system determines that the work machine 10 is operating in conditions where the at least one advanced braking feature 32 and the brake controller 21 determine that an automatic application of braking force is required. The brake force adjustment may be dynamically adjustable based on various conditions experienced by the work machine 10.

A system crossover point 54 is a visual representation of the pedal transition 29, wherein the braking system 20 provides additional braking power using braking energy derived from additional ones of the at least one braking sub-system 33. Where the brake pedal 40 is a power pedal, operation of the brake pedal 40 may provide an electric signal to the braking system 20 to increase power of the braking system. Where the brake pedal 40 is a force pedal, operation of the brake pedal 40 may directly apply mechanical braking force to the braking system 20. The pedal transition 29 is responsive to the pedal profile 28, and thus the system crossover point 54 may be configurable by the braking system 20 when the brake pedal is a power pedal, or may be dynamically adjustable by the braking system 20 when the brake pedal is a force pedal.

An end point 55 of the brake force curve 52 provides a visual representation of the maximum brake force of the braking system as determined by the force limit 27. The force limit 27 may be fully configurable by the braking system 20 and set by the brake controller 21. Furthermore, a pedal force slope 56 corresponding to pedal force 39 may also be fully configurable by the braking system 20 based on various operating conditions, capabilities of different models of the work machine 10, or may also be configurable to suit the preference of the operator.

INDUSTRIAL APPLICABILITY

In operation, the teachings of the present disclosure can find applicability in many industries including but not limited to machines used in the earth moving, mining, agricultural, and construction industries. While depicted and described in conjunction with a mining machine, such teachings can also find applicability with other machines such as loaders, track-type tractors, motor graders, off highway trucks, locomotives, and the like. As machines like these are of enormous size and are massive, braking systems in these machines are critical to effective operation of the machines, as stopping machines of this size may be extremely difficult and may require a large amount of force.

Figure 5:
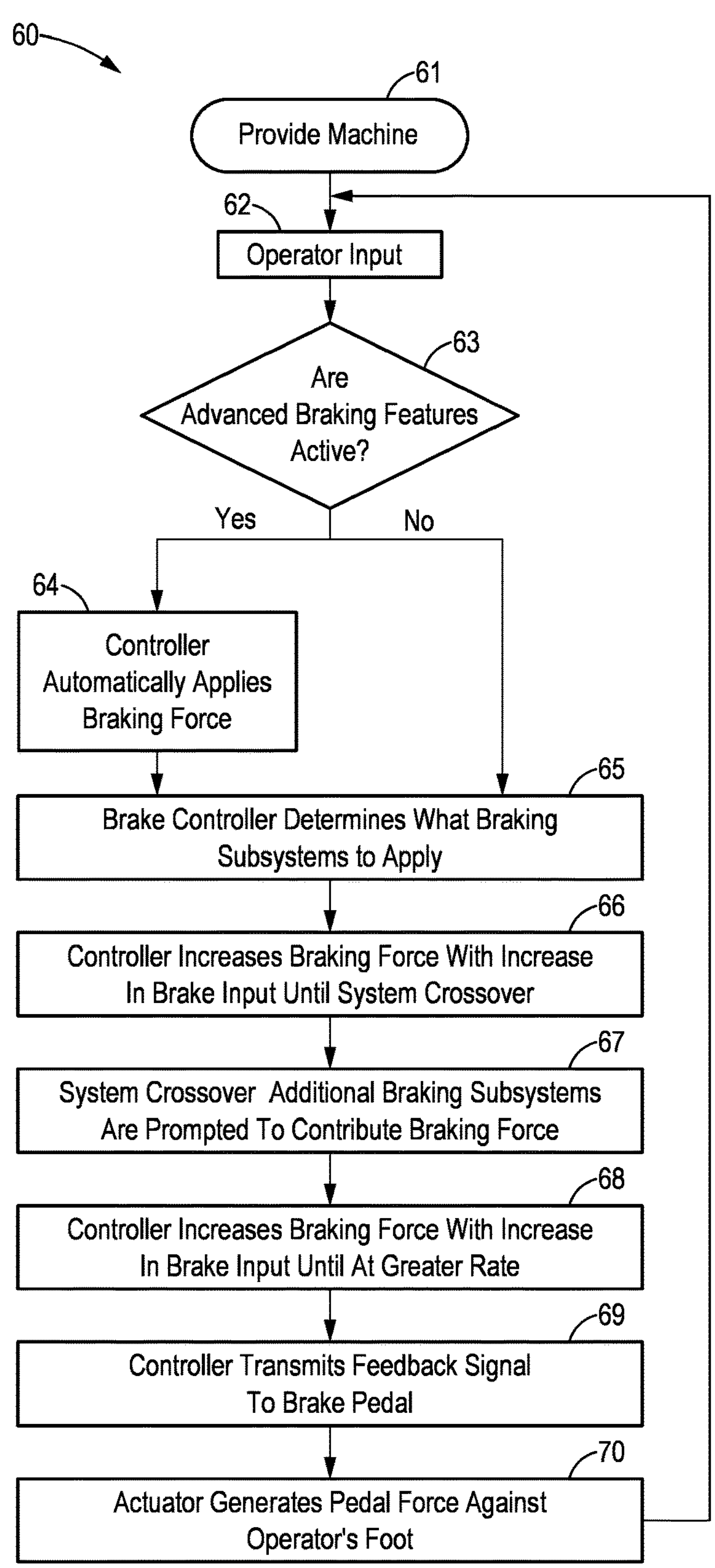
FIG. 5 is a flowchart depicting a sample sequence of steps which may be practiced in accordance with a method of operating a work machine of the present disclosure.

FIG. 5 illustrates a visual representation of a method 60 of operating a work machine 10 operating with braking performance represented visually in FIG. 4. In a first step 61, the work machine 10 having the braking system 20 including the at least one braking sub-system 33 is provided. More specifically the work machine 10 may include a brake pedal 40, and a brake controller 21. The work machine 10 may include the frame 11, the drivetrain 12, the engine 13, the driving ground-engaging members 14 in the form of wheels, the implement 15, and the operator cabin 16. The brake pedal 40 of the work machine 10 may be located in the operator cabin 16.

In the course of operating the work machine 10, the operator may determine that a braking force needs to be applied to the work machine 10 in order to slow down or maintain speed, for example by stopping deceleration downhill. In a second step 62, the operator commands the work machine 10 to apply the braking force through interaction with the brake input device. As depicted and described, the brake input device is the brake pedal 40, however, other brake input devices such as levers and dials, among other controls to modulate braking of the work machine 10, may be implemented. The operator actuates the brake pedal 40, and this actuation is depicted on the x-axis of FIG. 4 as a pedal actuated position as a percentage. Actuating the brake pedal 40 causes the operator input signal 23 to be sent to the brake controller 21.

The brake controller 21 may be configured with the at least one advanced braking feature 32 to detect changes in the operating conditions of the work machine 10. Changes in the terrain, climate, speed, or road surface on which the work machine 10 is operating may require automatic application of braking force without input from the operator. For example, the at least one advanced braking feature 32 may detect if the work machine 10 is operating on a downhill slope requiring additional braking force, or may detect if a loss of traction is occurring to the drivetrain requiring a corrective braking force. In a third step 63, the brake controller 21 identifies if the at least one advanced braking feature 32 is activated through the machine status signal 24. FIG. 4 depicts a fourth step 64, where the brake controller 21 has automatically applied a braking force through activation of the at least one advanced braking feature 32 represented by the brake force adjustment 53 being at a first braking level.

Regardless of whether an automatic braking force is already applied, in a fifth step 65, the brake controller 21 determines which of the at least one braking sub-system 33 to apply in response to the braking input from the operator. In a sixth step 66, the brake controller 21 sends the brake command signal 25 from the brake controller 21 to the at least one braking sub-system 33 of the work machine 10. In so doing, the brake controller 21 directs the at least one braking sub-system 33 to apply a braking force to the drivetrain 12 at a configurable rate until the braking force is at a second braking level. The second braking level is higher than the first braking level, and is depicted in FIG. 4 at the system crossover point 54, which may be configurable or dynamically adjustable by the brake controller.

The brake controller 21 may determine that additional ones of the at least one braking sub-system 33 are required to be activated in order to generate additional braking force past the second braking level. The additional systems are activated in a seventh step 67, and depicted in FIG. 4 at the system crossover point 54. Once the additional systems are activated, in an eighth step, the brake controller increases braking force as the operator provides increased braking input at a greater rate than prior to the system crossover point 54 until the brake force is at a maximum, represented in FIG. 4 by the end point 55. The brake controller 21 is configured to always add additional braking force to the work machine 10 as the operator provides input through the brake pedal 40. Thus, the operator does not experience any deadband in the braking of the work machine 10.

Optionally, where the brake pedal 40 is a dynamic pedal as described, when the brake controller 21 sends the brake command signal 25, in a ninth step 69, the brake controller 21 simultaneously transmits the pedal feedback signal 26 to the brake pedal 40. The brake pedal 40 receives the pedal feedback signal 26, and in a final step 70, the force reaction actuator 44 of the brake pedal receives the pedal feedback signal 26 and generates the pedal force 39. The operator experiences increased force feedback as the braking force of the work machine 10 is increased, and experiences distinct changes to the rate of force feedback as the system crossover point 54 is passed.

The method 60 of operating a work machine 10 describes operation of the braking system 20 of the work machine 10 of the primary embodiment, and how in operation, the braking system 20 provides the work machine 10 with consistent brake response regardless of which of the at least one braking sub-systems 33 or the at least one advanced braking features 32 of the braking system 20 are active. The braking system 20 may be easy to implement and retrofit, and may further be utilized to prevent wear to mechanical components of braking systems in work machines.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A work machine comprising:

a frame;

an engine supported by the frame;

a drivetrain connected to the engine;

a ground-engaging member connected to the drivetrain;

an operator cabin supported by the frame;

a work implement operatively associated with the frame; and a braking system having:

a brake input device located in the operator cabin for receiving an operator braking input;

at least one braking sub-system associated with the drivetrain;

a controller operatively connected to the brake input device and the at least one braking sub-system, the controller having at least one advanced braking feature that causes the at least one braking sub-system to automatically apply a braking force based on a detected operating condition; and the controller configured to address deadband operation of the brake input device when the at least one braking sub-system is applying the automatic braking force by causing the at least one braking sub-system to apply an additional progressive braking force corresponding to the operator braking input in response to the at least one braking sub-system applying the automatic braking force and the brake input device receiving the operator braking input.

2. The work machine of claim 1, wherein the at least one braking sub-system comprises mechanical friction brakes.

3. The work machine of claim 2, wherein the at least one braking sub-system further comprises at least one of: electric resistive grids, battery regeneration, hydraulic retarders, and engine compression brakes.

4. The work machine of claim 1, wherein the at least one advanced braking feature comprises at least one of: automatic grade brake speed control, anti-lock brake control, traction control, and stability control.

5. The work machine of claim 1, wherein the engine is one of: a fuel-injected engine, an electric motor, and a hybrid powerplant including fuel-injected components and electric components.

6. The work machine of claim 1, wherein the brake input device is one of a pedal, a lever, or a dial.

7. The work machine of claim 1, further comprising an actuator to apply a variable force feedback to the brake input device as the braking system activates an additional one of the at least one braking sub-system.

8. A braking system for a work machine, comprising:

a brake input device located in a cabin for receiving an operator braking input;

at least one braking sub-system;

a controller operatively connected to the brake input device and the at least one braking sub-system, the controller having at least one advanced braking feature that causes the at least one braking sub-system to automatically apply a braking force based on a detected operating condition; and the controller configured to address deadband operation of the brake input device when the at least one braking sub-system is applying the automatic braking force by causing the at least one braking sub-system to apply an additional progressive braking force corresponding to the operator braking input in response to the at least one braking sub-system applying the automatic braking force and the brake input device receiving the operator braking input.

9. The braking system of claim 8, wherein the work machine further comprises at least one wheel, and the at least one braking sub-system comprises at least one mechanical friction brake at a corresponding one of the at least one wheel.

10. The braking system of claim 9, wherein the at least one braking sub-system includes a second braking sub-system including at least one of: electric resistive grids, battery regeneration, hydraulic retarders, and engine compression brakes.

11. The braking system of claim 8, wherein the at least one advanced braking feature includes at least one of: automatic grade brake speed control, anti- lock brake control, traction control, and stability control.

12. The braking system of claim 8, wherein the work machine includes an engine providing power and motive force to the work machine, the engine being one of: a fuel-injected engine, an electric motor, and a hybrid powerplant including fuel-injected components and electric components.

13. The braking system of claim 8, wherein a position of the brake input device is proportional with and determines one of a brake force or a brake power applied by the at least one braking sub-system in response to the brake input device receiving the operator braking input.

14. The braking system of claim 8, further comprising an actuator to apply a variable force feedback to the brake input device as the braking system activates an additional one of the at least one braking sub-system.

15. A method of operating a work machine having a braking system including a brake input device, at least one braking sub-system, and a controller operatively connected to the brake input device and the at least one braking sub-system, the method comprising:

causing, by at least one advanced braking feature of the controller, the at least one braking sub-system to apply an automatic braking force with the at least one braking sub- system based on a detected operating condition of the work machine;

receiving an operator brake input at the brake input device; and in response to the at least one braking sub-system automatically applying the automatic braking force and receiving the operator brake input at the brake input device, causing, by the controller, the at least one braking sub-system to apply an additional progressive braking force corresponding to the operator braking input to address deadband operation of the brake input device when the at least one braking sub-system is applying the automatic braking force.

16. The method of claim 15, further comprising applying a variable force feedback to the brake input device as the braking system activates an additional one of the at least one braking sub-system.

17. The method of claim 15, wherein the at least one braking sub- system includes mechanical friction brakes; and wherein applying the automatic braking force includes applying the automatic braking force via the mechanical friction brakes.

18. The method of claim 17, wherein the at least one braking sub- system further includes a second braking sub-system comprising at least one of at least one of:

electric resistive grids, battery regeneration, hydraulic retarders, and engine compression brakes; and wherein causing the at least one braking sub-system to apply the additional progressive braking force includes causing the at least one braking sub-system to apply the additional progressive braking force with the second braking sub-system.

19. The method of claim 15, wherein the at least one advanced braking feature includes at least one of: automatic grade brake speed control, anti-lock brake control, traction control, and stability control.

20. The method of claim 15, further comprising detecting the operating condition of the work machine with the controller having the at least one advanced braking feature.

* * * * *